United States Patent [19]

Pulliam

[11] Patent Number: 5,782,419

[45] Date of Patent: Jul. 21, 1998

[54] SLIDABLE THUMB BAR FOR A SPINCAST REEL

[75] Inventor: Thomas A. Pulliam, Broken Arrow, Okla.

[73] Assignee: Zebco Division of Brunswick Corp., Tulsa, Okla.

[21] Appl. No.: 729,327

[22] Filed: Oct. 15, 1996

[51] Int. Cl.$^6$ .................................................. A01K 89/01
[52] U.S. Cl. ........................................................ 242/236
[58] Field of Search ................................. 242/236, 238, 242/239, 240

[56] References Cited

U.S. PATENT DOCUMENTS

| 2,675,192 | 4/1954 | Hull | 242/238 |
|---|---|---|---|
| 2,903,201 | 9/1959 | Sarah | 242/236 |
| 3,034,741 | 5/1962 | Macy et al. | 242/240 |
| 3,697,011 | 10/1972 | Christensen et al. | 242/240 |
| 4,101,087 | 7/1978 | Harre et al. | 242/236 |
| 4,640,470 | 2/1987 | Ohler | 242/238 |
| 4,662,585 | 5/1987 | Neufeld . | |
| 5,137,227 | 8/1992 | Allis et al. . | |
| 5,199,665 | 4/1993 | Tipton . | |
| 5,236,148 | 8/1993 | Valentine . | |
| 5,323,986 | 6/1994 | Takeuchi | 242/240 |
| 5,427,325 | 6/1995 | Weaver . | |

*Primary Examiner*—Katherine Matecki
*Attorney, Agent, or Firm*—Wood, Phillips, VanSanten, Clark & Mortimer

[57] ABSTRACT

A fishing reel is disclosed having a frame including a housing, and an operating mechanism on the frame that is placeable selectively in a retrieve mode and a cast mode, wherein the operating mechanism includes a line carrying spool, a first structure for retrieving line onto the spool with the fishing reel in the retrieve mode, an actuator operably connected to the frame for guided sliding translatory movement between a first position and a second position, and a second structure cooperating between the first structure and actuator for changing the fishing reel from the retrieve mode to the cast mode as an incident of the actuator moving from its first position into its second position. The first structure including a shaft with an axis, the shaft being operably connected to the spool and repositionable by the second structure as an incident of the actuator moving from its first position into its second position. The housing including a back cover and the actuator positioned for guided sliding translatory movement in a channel formed on the back cover. The second structure including a trip plate slidably mounted in a groove formed on an inside surface of the back cover and operably connected to the actuator through at least one guide slot formed in the back cover. The trip plate including an actuating member extending generally therefrom having an angled shaft engaging surface for operably engaging the shaft. The guided sliding translatory movement of the actuator between its first and second positions causes axial displacement of the shaft, along the angled shaft engaging surface, between (a) a first state wherein the fishing reel is in the retrieve mode and (b) a second state wherein the fishing reel is in the cast mode, wherein the guided sliding translatory movement of the actuator is in a direction generally transverse to the axial displacement of the shaft.

13 Claims, 4 Drawing Sheets

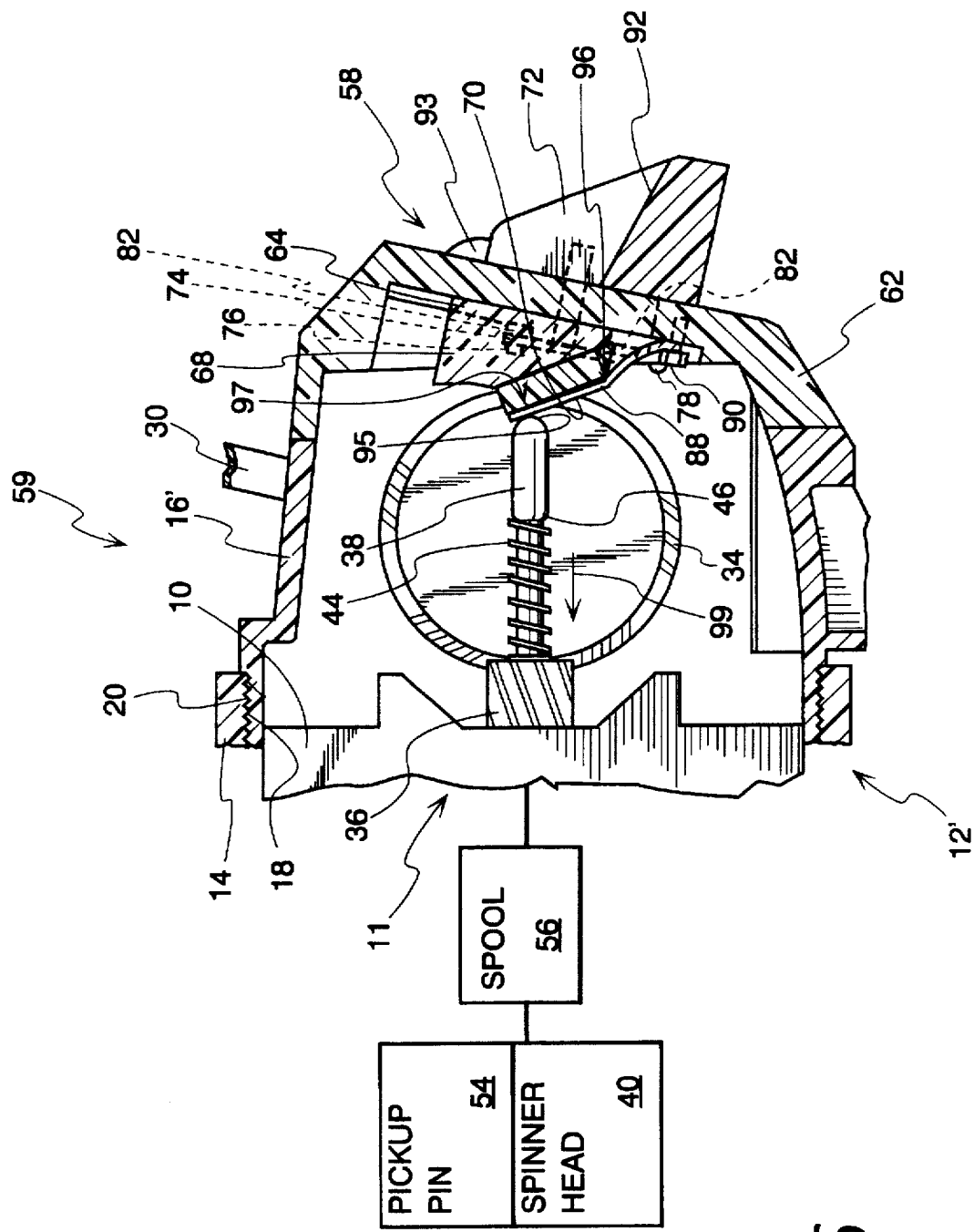

SLIDABLE THUMB BAR FOR A SPINCAST REEL

BACKGROUND OF THE INVENTION

1. Field of the Invention

This invention relates to fishing reels having a repositionable center shaft and, more particularly, to a slidable thumb bar actuator through which movement of the center shaft is effected.

2. Background Art

In conventional spincast fishing reels, a pivotable thumb button is employed to place the reel selectively in its casting mode. The thumb button is typically pivotably mounted in an opening at the rear of the reel housing and, once depressed, shifts a center shaft forwardly which in turn moves a spinner head disposed at the distal end of the center shaft and simultaneously retracts a pick-up pin. The forward shifting spinner head snubs the line against an inside surface of the housing to allow the rod to be cocked without line pay out. The thumb button is released at the same time the rod is thrust forwardly so that the line freely uncoils from a spool on which it is stored. U.S. Pat. No. 4,662,585 to Neufeld, which patent is incorporated herein by reference, discloses the details of a spincast fishing reel.

Pivoting the thumb button to place the reel in its casting mode requires both downward and forward movement by the thumb of a user. As the thumb button is depressed, the thumb is pressed downwardly and must be extended forwardly to follow the pivoting path of the thumb button. After a day of fishing in which numerous casts have been made, the repeated downward and forward movement of the thumb may cause discomfort and/or muscle aching or cramping.

SUMMARY OF THE INVENTION

The present invention is specifically directed to overcoming the above enumerated problems in a novel and simple manner.

The present invention is directed to a fishing reel having a frame including a housing, and an operating mechanism on the frame that is placeable selectively in a retrieve mode and a cast mode, wherein the operating mechanism includes a line carrying spool, a first structure for retrieving line onto the spool with the fishing reel in the retrieve mode, an actuator operably connected to the frame for guided sliding translatory movement between a first position and a second position, and a second structure cooperating between the first structure and actuator for changing the fishing reel from the retrieve mode to the cast mode as an incident of the actuator moving from its first position into its second position, wherein the first structure includes a shaft with an axis. The shaft being operably connected to the spool and repositionable by the second structure as an incident of the actuator moving from its first position into its second position.

In one form, the shaft is axially displaceable by the second structure between (a) a first state wherein the fishing reel is in the retrieve mode and (b) a second state wherein the fishing reel is in the cast mode.

In one form, the housing includes a back cover and the actuator is positioned for guided sliding translatory movement in a channel formed on the back cover.

In one form, the second structure includes a trip plate slidably movable in a slot formed on an inside surface of the back cover and having a shaft engaging surface. The trip plate may be operably connected to the thumb bar through at least one guide slot formed in the back cover.

In one form, an actuating member extends generally from the trip plate and has an angled shaft engaging surface having upper and lower ends, wherein (a) with the actuator in its first position the shaft operably engages the lower end of the angled shaft engaging surface and (b) with the actuator in its second position the shaft operably engages the upper end of the angled shaft engaging surface.

In one form, the guided sliding translatory movement of the actuator between its first and second positions causes sliding movement of the actuating member, with both movements in a direction generally transverse to the axial displacement of the shaft, such that axial displacement of the shaft occurs as the shaft operably engages the angled shaft engaging surface of the actuating member between its lower and upper ends as an incident of the sliding movement of the actuator and actuating member.

A plate spring may be disposed between the shaft and the angled shaft engaging surface of the actuating member.

Other objects, features, and advantages of the invention will be apparent from the following detailed description taken in connection with the accompanying drawings.

BRIEF DESCRIPTION OF THE DRAWINGS

FIG. 6 is a view as in FIG. 5 with the thumb bar in a second position and the reel in a cast mode.

DETAILED DESCRIPTION OF THE PREFERRED EMBODIMENT

Figure 1:
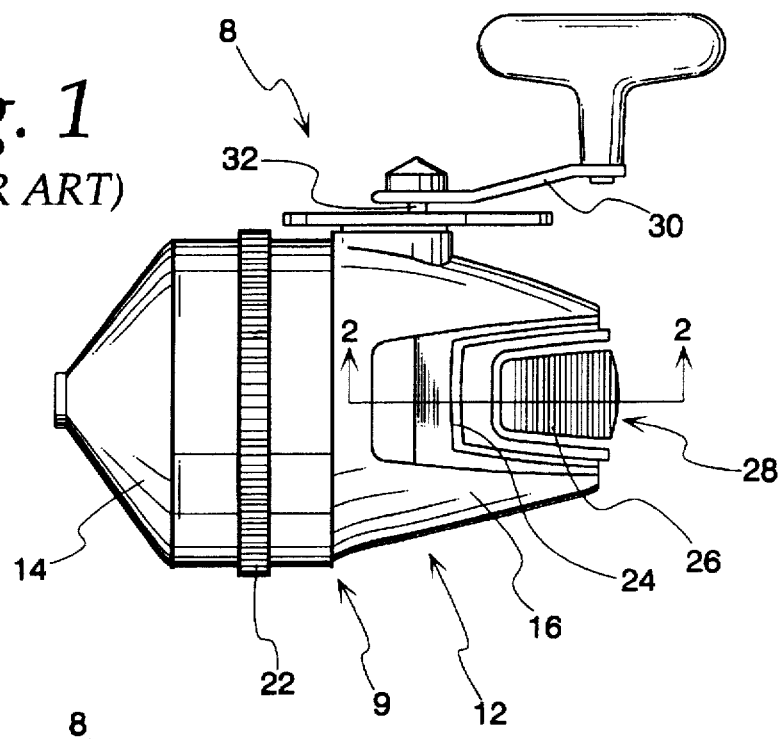
FIG. 1 is a top view of a prior art spincast fishing reel with a depressible pivoting thumb button.
Figure 2:
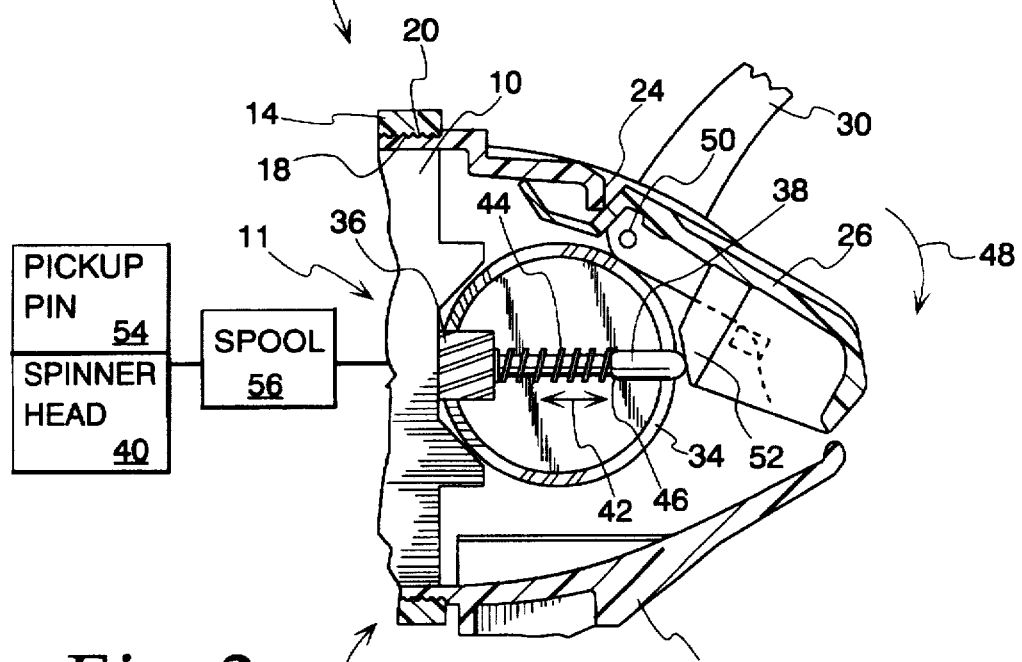
FIG. 2 is a fragmentary sectional view of the rear portion of the fishing reel, on an enlarged scale, taken along the line 2—2 of FIG. 1.
Figure 3:
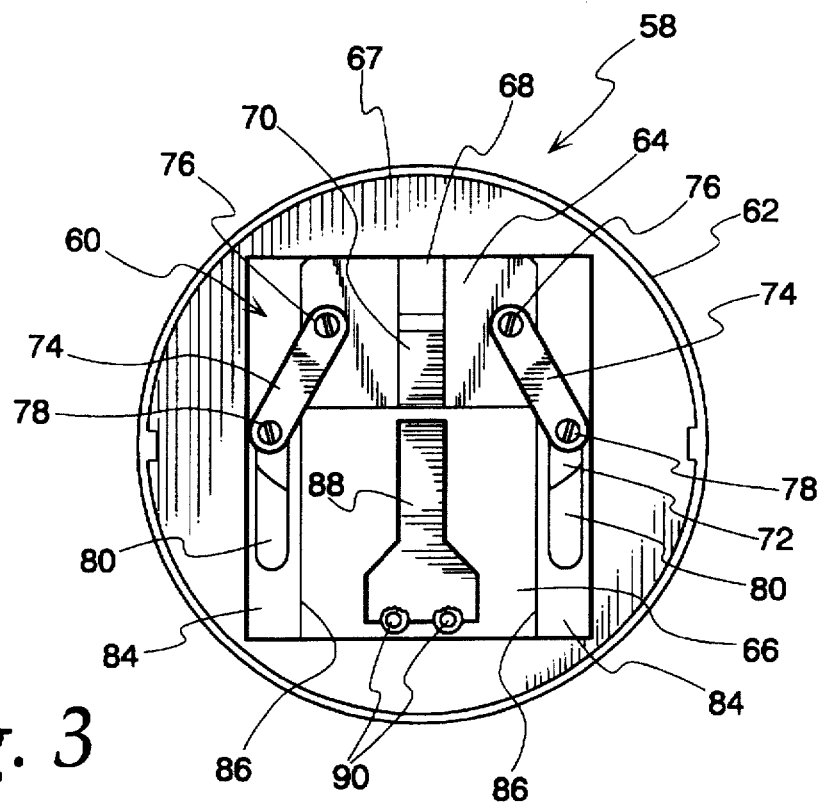
FIG. 3 is a front elevation view of a thumb bar assembly in accordance with the present invention operably connected to a back cover of a reel housing.
Figure 4:
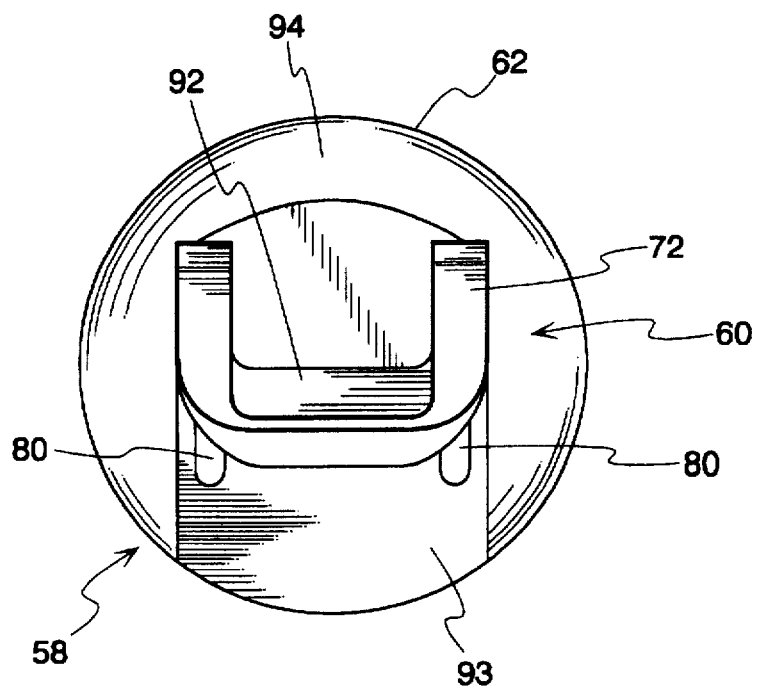
FIG. 4 is a rear elevation view of the thumb bar assembly of FIG. 3 operably connected to the back cover of the reel housing.

In FIGS. 1 and 2, a conventional spincast type fishing reel 8 is shown and generally includes a frame 9 including a deck plate 10 that supports a reel operating mechanism at 11. A housing at 12 encloses at least part of the reel operating mechanism 11. The housing 12 consists of a front cup-shaped cover 14 and a rear cup-shaped cover 16. The front cover 14 has internal threads 18 formed on the rearmost internal surface thereof. The rear cover 16 has external threads 20 formed on a forwardly facing end portion thereof for mating with the internal threads 18 of the front cover 14. A gripping ring 22 is formed about the outside of the front cover 14 to facilitate manual rotation of the front cover 14.

The rear cover 16 has an opening 24 that is substantially rectangular in shape and extends through a sloped upper portion and vertical rear portion of the rear cover 16. A one-piece thumb button 26 has a shape substantially mating with the shape of the opening 24 in the rear cover 16. The upper surface of the thumb button 26 is normally ridged, as shown at 28, which prevents an operator's thumb or finger from slipping as the thumb button 26 is depressed.

A crank handle 30, through a crank shaft 32, rotates a face gear 34 which is meshed with a pinion gear 36 fixed to a center shaft 38 for rotating the center shaft 38. The center shaft 38 rotates a spinner head 40, which is mounted to the front distal end of the center shaft 38. The center shaft 38 is mounted to the deck plate 10 for fore and aft movement in the direction of the double-headed arrow 42. A coil spring 44 surroundingly embraces the center shaft 38 and abuts against a shoulder 46 of the shaft 38 to normally bias the shaft 38 rearwardly, i.e., to the right in FIG. 2.

Downward pressure on the thumb button 26 effects pivoting thereof in a clockwise direction, indicated by the arrow 48, about laterally extending pivot pins 50. As this occurs, a depending boss 52 on the thumb button 26 engages and shifts forwardly the center shaft 38. Movement of the center shaft 38 in a forward direction, i.e., right to left in FIG. 2, shifts the spinner head 40 forwardly and retracts a pickup pin 54. The reel 8 is thereby placed in a cast mode wherein the spinner head 40 is borne against the inside surface of the front cover 14. Casting is then effected by cocking the rod with the thumb button 26 depressed and simultaneously thrusting the rod and releasing the thumb button 26 to allow the line to pay out freely from the spool 56. The remaining specific mechanism through which the reel is operated is generally known and does not form a part of this invention, and thus a detailed discussion thereof is omitted. A reel operating mechanism for an exemplary spincast fishing reel is described fully in U.S. Pat. No. 4,415,129 to Neufeld, which patent is incorporated herein by reference.

The present invention, as depicted in FIGS. 3–6, is directed to a thumb bar assembly 58 designed to effect forward movement of the center shaft 38 to effectuate a change of the fishing reel 59 from its retrieve mode into its cast mode. It should be understood that the inventive thumb bar assembly 58 can be incorporated into any fishing reel that is changeable from a retrieve mode to a cast mode by repositioning of a center shaft or like element. Since many of the elements in the reel 59 in FIGS. 3–6 correspond to those in the prior art reel 8, like reference numerals will be used for corresponding parts. Elements that correspond but are slightly modified will be identified using the same reference numerals and with a "'".

The thumb bar assembly 58 generally includes an actuator at 60 mounted on a cup-shaped housing 62. The actuator 60 includes a trip plate 64 mounted for guided sliding translatory movement in a slot 66 formed on an inner surface 67 of the housing 62. The housing 62 may be connected to the rear cover 16' via a bayonet or other conventional connecting means. It should be understood that while FIGS. 3–6 depict the housing 62 and rear cover 16' as separate elements, the rear cover 16' may simply be modified to accommodate the thumb bar assembly 58, thus negating the need for a separate housing element.

The actuator 60 includes actuating member 68 which projects forwardly from the trip plate 64 and includes an angled shaft engaging surface 70. The trip plate 64 is operably connected to a thumb bar 72 on the actuator 60 via connecting members 74. Screws 76 connect one end of each connecting member 74 to the trip plate 64. Screws 78 are attached to the other end of each connecting member 74 and are connected to the thumb bar 72 through vertically extending guide slots 80. The guide slots 80 guide sliding translatory movement of the trip plate 64 and thumb bar 72 in a vertical direction along the length of the slots 80, and also limit relative vertical movement of both the trip plate 64 and thumb bar 72 relative to the housing 62. Spacers 82 (see FIGS. 5–6) are disposed at the distal ends of the connecting members 74 providing a secure connection between, and facilitating smooth movement of, the trip plate 64 and thumb bar 72.

The guide slots 80 are formed, one each, in thickened channels 84 on opposite sides of the slot 66 on the inner surface 67 of the housing 62. The channels 84 define guiding edges 86 at the lateral edges of the slot 66 for assisting in guiding the sliding movement of the trip plate 64. A plate spring/bias element 88 is secured in cantilever fashion to the inner surface 67 of the housing 62 by screws 90. The plate spring 88 is disposed between the center shaft 38 and the shaft engaging surface 70 of the actuating member 68, as can be seen from FIGS. 5–6.

The thumb bar 72 is provided with an upwardly facing thumb engaging surface 92 which may include ridges (not shown). The thumb bar 72 is mounted for guided sliding translatory movement in a channel 93 formed on an outer surface 94 of the housing 62.

Figure 5:
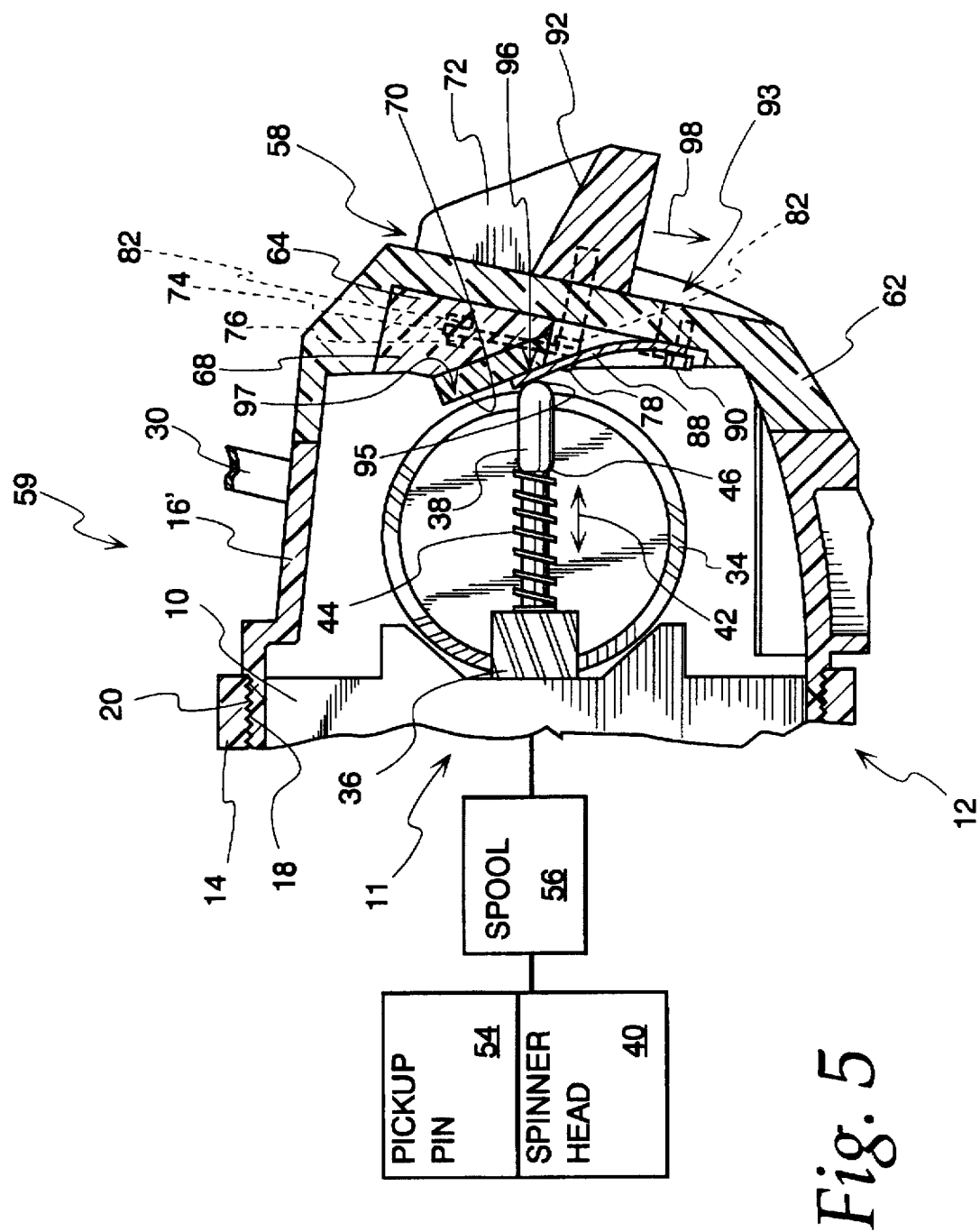
FIG. 5 is a fragmentary sectional view of a fishing reel with the thumb bar assembly on the back cover in accordance with the present invention assembled thereto and with the thumb bar in a first position and the reel in a retrieve mode.

Operation of the thumb bar assembly 58 of the present invention will now be described with reference to FIGS. 5–6. FIG. 5 depicts the thumb bar assembly 58 of the present invention operably connected to a spincast fishing reel 59, with the fishing reel 59 in its retrieve mode. As can be seen in FIG. 5, with the reel 59 in its retrieve mode, the rear free end 95 of the center shaft 38 operably engages a lower end 96 of the shaft engaging surface 70 with the plate spring 88 disposed therebetween. The shaft engaging surface 70 is angled forwardly, as is seen from FIG. 5, from the lower end 96 to an upper end 97.

As the thumb bar 72 is pressed in a downward direction with the actuator 60 in a first state as shown in FIG. 5, as indicated by the arrow 98, generally transverse to the axial displacement of the center shaft 38, the downward movement of the associated trip plate 64, actuating member 68 and angled shaft engaging surface 70 causes the distal end 95 of the shaft 38 to move axially along the angled shaft engaging surface 70 from its lower end 96 to its upper end 97. This causes forward shifting of the center shaft 38 and attached spinner head 40 in a direction generally indicated by the arrow 99 in FIG. 6, which effects a change of the fishing reel 59 from the retrieve mode as shown in FIG. 5 to the cast mode, as the actuator 60 realizes a second state, as shown in FIG. 6.

FIG. 6 depicts the reel 59 in the cast mode, with the center shaft 38 axially moved in a forward direction indicated by the arrow 99. In this position, the rear free end 95 of the center shaft 38 operably engages the upper end 97 of the shaft engaging surface 70, with the plate spring 88 disposed therebetween. Casting is thus effected in the same manner as in the prior art, namely, by cocking the rod with the thumb bar 72 depressed downward and simultaneously thrusting the rod and releasing the thumb bar 72 to allow the line to pay out freely from the spool 56. Upon release of the thumb bar 72, the plate spring 88 biases the thumb bar 72 in generally an upward direction, opposite arrow 98, to permit the spring 44 to return the center shaft 38 to its aft position, as shown in FIG. 5, to place the reel 59 in the retrieve mode.

It will be understood that the invention may be embodied in other specific forms without departing from the spirit or central characteristic thereof. The present example and embodiment, therefore, is to be considered in all respects as illustrative and not restrictive, and the invention is not to be limited to the details given herein.

I claim:

1. A fishing reel comprising:
   a frame including a housing;
   a spool on the frame; and
   an operating mechanism on the frame, with the operating mechanism being placeable selectively in a retrieve mode, wherein the operating mechanism can be operated to direct line onto the spool, and a cast mode, wherein line can be paid off the spool, said operating mechanism comprising:

a shaft with an axis, said shaft being movable guidingly relative to the frame between first and second positions, the operating mechanism changing from the retrieve mode into the cast mode as an incident of the shaft moving from the first position into the second position;

an actuator connected to the frame for guided movement relative to the frame between a first state and a second state; and a bias element for normally urging the actuator toward the first state, wherein at least part of the bias element is urged by the actuator toward the shaft to thereby transmit a force from the actuator through the bias element to cause the shaft to move from the first position into the second position as an incident of the actuator moving from the first state into the second state.

2. The fishing reel according to claim 1 wherein the actuator comprises a trip plate, a thumb bar, and a connecting member which extends through the housing and connects the trip plate and thumb bar.

3. The fishing reel according to claim 2 wherein the housing has an elongate slot through which the connecting member extends, the connecting member moving guidingly in the elongate slot and thereby guiding movement of the thumb bar and trip plate relative to the housing as the actuator changes from the first state into the second state.

4. The fishing reel according to claim 2 wherein the connecting member comprises a first elongate link having spaced ends, one of the spaced ends of the first elongate link is pivotably connected to the trip plate and the other of the spaced ends of the first elongate link is pivotably connected to the thumb bar.

5. The fishing reel according to claim 4 wherein the actuator comprises a second elongate link having spaced ends, one of the spaced ends of the second elongate link is pivotably connected to the trip plate and the other of the spaced ends of the second elongate link is pivotably connected to the thumb bar.

6. The fishing reel according to claim 1 wherein the actuator comprises a trip plate having a surface thereon that cams the part of the bias element against the shaft to thereby cause the shaft to move from the first position into the second position as the actuator changes from the first state into the second state.

7. The fishing reel according to claim 6 wherein the surface on the trip plate is substantially flat and a plane parallel to the flat surface is non-perpendicular to the shaft axis.

8. The fishing reel according to claim 7 wherein the frame has a slot, the actuator comprises a screw which pivotably connects the other of the spaced ends of the first elongate link to the thumb bar, and the screw extends through the slot and is guided in the slot as the actuator moves from the first state into the second state.

9. The fishing reel according to claim 6 wherein the bias element has a single piece that is connected to the frame and acts directly against the trip plate surface and the shaft as the actuator moves from the first state into the second state.

10. The fishing reel according to claim 1 wherein the bias element is fixedly connected in cantilever fashion to the frame.

11. The fishing reel according to claim 10 wherein the actuator comprises a trip plate with a surface that progressively moves a part of the bias element along the shaft axis to urge the shaft from the first position towards the second position as the actuator moves from the first state into the second state.

12. The fishing reel according to claim 1 wherein the bias element has a single piece that is connected to the frame and is urged directly against the shaft as the actuator moves from the first state into the second state.

13. The fishing reel according to claim 1 wherein the actuator comprises a thumb bar that is guided in a translatory path relative to the frame as the actuator changes from the first state into the second state.

* * * * *